(12) United States Patent
Sawai et al.

(10) Patent No.: US 12,045,388 B2
(45) Date of Patent: Jul. 23, 2024

(54) FINGER DETECTION DEVICE AND METHOD PROVIDING INCREASED RELIABILITY DETECTING ATTITUDES OF FINGERS

(71) Applicant: SONY GROUP CORPORATION, Tokyo (JP)

(72) Inventors: Kunihito Sawai, Kanagawa (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/013,137

(22) PCT Filed: Jul. 7, 2021

(86) PCT No.: PCT/JP2021/025658
§ 371 (c)(1),
(2) Date: Dec. 27, 2022

(87) PCT Pub. No.: WO2022/014445
PCT Pub. Date: Jan. 20, 2022

(65) Prior Publication Data
US 2023/0244312 A1    Aug. 3, 2023

(30) Foreign Application Priority Data
Jul. 14, 2020   (JP) ................................ 2020-120810

(51) Int. Cl.
*G06F 3/01*    (2006.01)
(52) U.S. Cl.
CPC .................................. *G06F 3/014* (2013.01)

(58) Field of Classification Search
CPC ............ G06F 3/01; G06F 3/011; G06F 3/014; G06F 3/016; G06F 3/017; G06F 3/041; G06F 3/0414; G06F 3/04142; G06F 3/04144; G06F 3/04146; G06F 3/04164
USPC .................................................. 345/156–179
See application file for complete search history.

(56) References Cited

U.S. PATENT DOCUMENTS

| 2005/0179644 | A1  | 8/2005 | Alsio et al. |
| 2007/0164878 | A1* | 7/2007 | Baier .................... G06F 3/0233 341/20 |
| 2010/0023314 | A1* | 1/2010 | Hernandez-Rebollar .................... G10L 13/00 704/E13.001 |
| 2010/0156783 | A1  | 6/2010 | Bajramovic |

(Continued)

FOREIGN PATENT DOCUMENTS

| JP | 2006-276651 A | 10/2006 |
| JP | 2012-073830 A | 4/2012 |

(Continued)

*Primary Examiner* — Ke Xiao
*Assistant Examiner* — Nelson Lam
(74) *Attorney, Agent, or Firm* — Paratus Law Group, PLLC

(57) ABSTRACT

Provided are a detection device and a detection method that more reliably detect attitudes of fingers of a user. The detection device of the present disclosure includes: a first sensor that is disposed in a space between a thumb and an index finger and detects first information obtained by sensing a first finger that is a finger included in a first detection area; and a second sensor that is disposed on a palm and detects second information obtained by sensing a second finger that is a finger included in a second detection area.

13 Claims, 10 Drawing Sheets

(56) References Cited

U.S. PATENT DOCUMENTS

| | | | |
|---|---|---|---|
| 2014/0098018 A1 | 4/2014 | Kim et al. | |
| 2015/0035743 A1* | 2/2015 | Rosener | G06F 3/0346 |
| | | | 345/156 |
| 2016/0070347 A1* | 3/2016 | McMillen | H03K 17/964 |
| | | | 345/173 |
| 2016/0246369 A1* | 8/2016 | Osman | A63F 13/212 |
| 2016/0259408 A1* | 9/2016 | Messingher | A63F 13/212 |
| 2017/0038839 A1* | 2/2017 | Seth | G06F 3/017 |
| 2019/0101981 A1* | 4/2019 | Elias | A41D 19/00 |
| 2019/0196584 A1* | 6/2019 | Billau | G06F 3/017 |
| 2019/0207618 A1* | 7/2019 | Lowe | H04W 4/70 |
| 2021/0081042 A1* | 3/2021 | Baier | G06F 3/017 |

FOREIGN PATENT DOCUMENTS

| | | |
|---|---|---|
| JP | 2017-516185 A | 6/2017 |
| JP | 2017-227687 A | 12/2017 |
| WO | WO 2016/038953 A1 | 3/2016 |
| WO | WO 2017/102922 A1 | 6/2017 |
| WO | WO 2018/079384 A1 | 5/2018 |
| WO | WO 2018/198272 A1 | 11/2018 |

\* cited by examiner (A)    (B)

(A)

(B)

(A)

(B)

FINGER DETECTION DEVICE AND METHOD PROVIDING INCREASED RELIABILITY DETECTING ATTITUDES OF FINGERS

CROSS REFERENCE TO PRIOR APPLICATION

This application is a National Stage Patent Application of PCT International Patent Application No. PCT/JP2021/025658 (filed on Jul. 7, 2021) under 35 U.S.C. § 371, which claims priority to Japanese Patent Application No. 2020-120810 (filed on Jul. 14, 2020), which are all hereby incorporated by reference in their entirety.

TECHNICAL FIELD

The present disclosure relates to a detection device and a detection method.

BACKGROUND ART

A technique of using attitudes of fingers of a user for controlling a device has been proposed. For example, Patent Document 1 below discloses that various types of control are performed on the basis of the shape of a user's finger (for example, the index finger, the middle finger, the ring finger, and the little finger) detected by a non-contact sensor. However, depending on how the fingers are bent, there may occur a case where a certain finger is hidden by another finger, and the shape of each finger may not be correctly detected. For example, the index finger is hidden by the thumb, and thus the shape of the index finger cannot be correctly detected. In addition, it is necessary to provide a contact sensor for each finger, and the number of sensors increases. For this reason, it is inconvenient for the user to move the fingers or hold an object.

CITATION LIST

Patent Document

Patent Document 1: WO 2016/038953 A

SUMMARY OF THE INVENTION

Problems to be Solved by the Invention

The present disclosure provides a detection device and a detection method that more reliably detect attitudes of fingers of a user.

Solution to Problems

A detection device of the present disclosure includes: a first sensor that is disposed in a space between a thumb and an index finger and detects first information obtained by sensing a first finger that is a finger included in a first detection area; and a second sensor that is disposed on a palm and detects second information obtained by sensing a second finger that is a finger included in a second detection area.

With a detection method of the present disclosure, first information obtained by sensing a first finger that is a finger included in a first detection area of a first sensor is detected by the first sensor disposed in a space between a thumb and an index finger, and second information obtained by sensing a second finger that is a finger included in a second detection area of a second sensor is detected by the second sensor disposed on a palm.

MODE FOR CARRYING OUT THE INVENTION

Hereinafter, embodiments of the present disclosure will be described with reference to the drawings. In one or more embodiments shown in the present disclosure, the elements included in each embodiment can be combined with each other, and the combined result also forms a part of the embodiments shown in the present disclosure.

Figure 1:
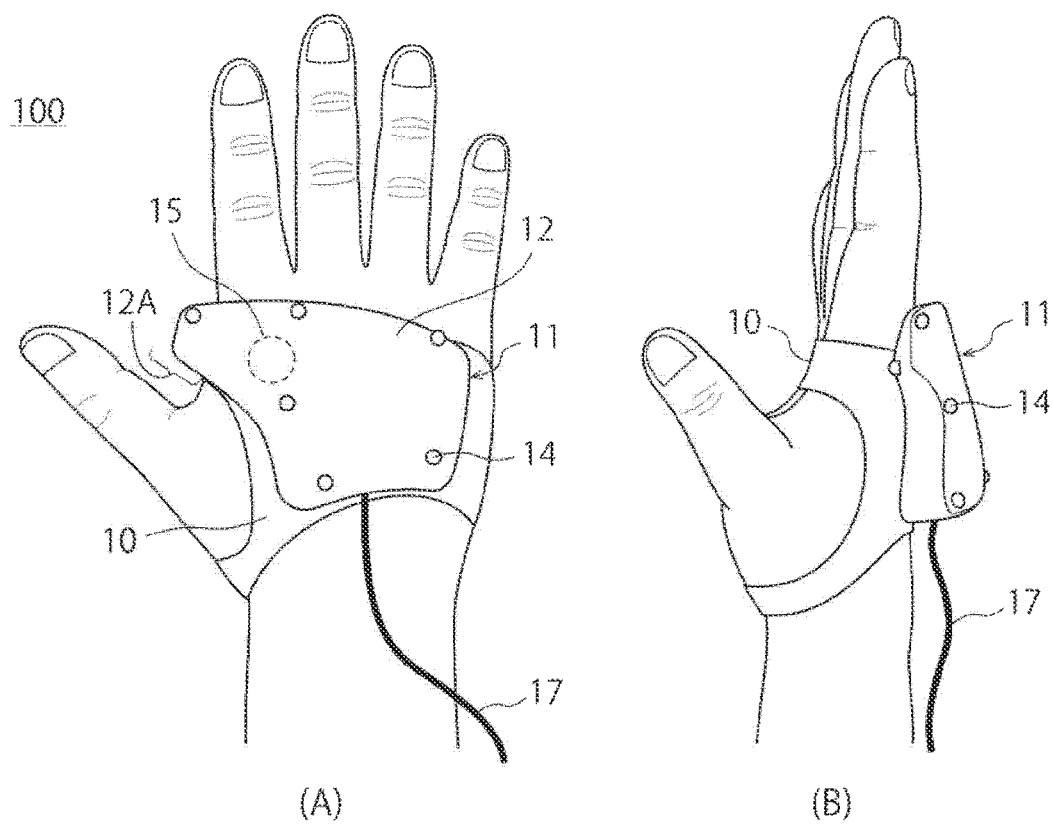
FIG. 1 is a block diagram of a controller including a detection device according to a first embodiment of the present disclosure.
Figure 2:
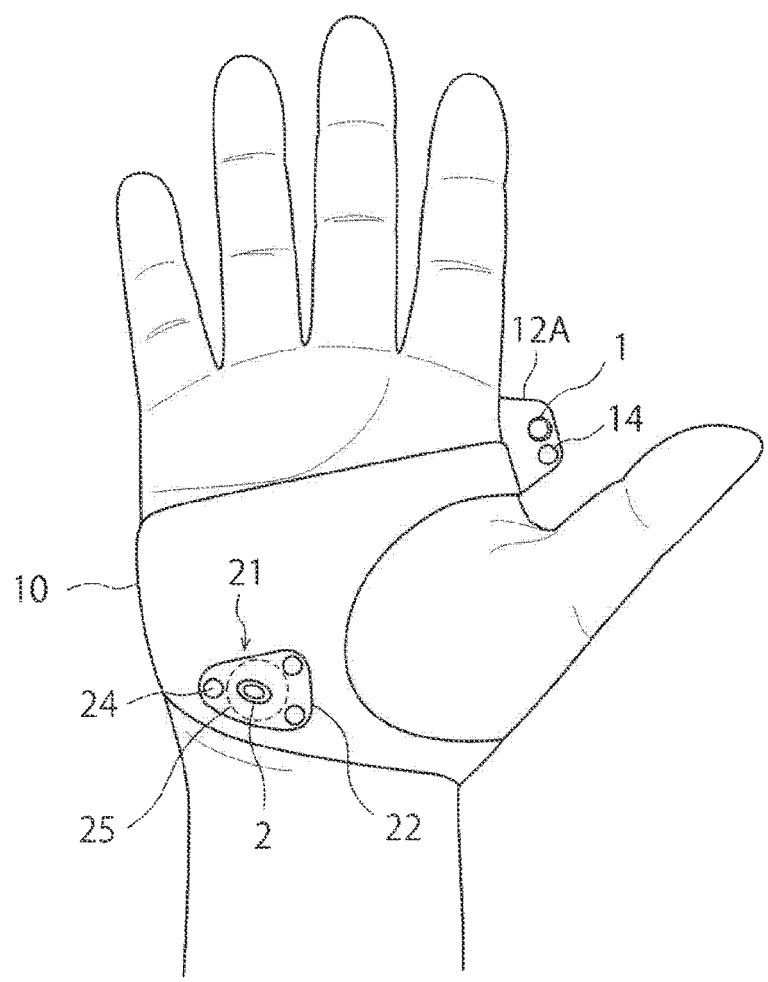
FIG. 2 is a diagram showing a palm-side of the controller of FIG. 1.

FIGS. 1 and 2 are block diagrams of a controller 100 that is an embodiment of a detection device according to a first embodiment of the present disclosure. FIG. 1(A) is a diagram showing the controller 100 on a back-side of the hand, and FIG. 1(B) is a diagram showing a side-surface of the controller 100 on a thumb-side. FIG. 2 is a diagram showing the controller 100 on a palm-side.

The controller 100 illustrated in FIGS. 1 and 2 is a controller for a right hand. A state in which the controller 100 is worn on the right hand of the user is illustrated. A controller for a left hand also has a similar configuration as the controller for the right hand except for a difference in shape between the left and right, or the like.

The controller 100 includes a main body unit 11 on the back-side of the hand, a sub unit 21 on the palm-side (see FIG. 2), and a mounting unit 10. The main body unit 11 is connected through wiring 17 to a computer that is a control device to be described later (see FIGS. 9 and 10), and capable of communicate with the computer. The computer provides a service by an application to the user by means of using the controller 100 and a head device (see FIGS. 9 and 10) to be worn on the head of the user. Here, the configuration in which the main body unit 11 communicates with the computer in a wired manner has been described, but a configuration in which the main body unit 11 communicates with the computer in a wireless manner is also possible. Furthermore, the controller 100 may have a configuration capable of communicating with the head device in a wired or wireless manner.

The mounting unit 10 allows the main body unit 11 and the sub unit 21 to be worn on the hand of the user. The mounting unit 10 includes a covering unit (mounting cover) that covers at least partially the back of the hand and the palm. The covering unit is, as an example, a belt configured of a soft material such as cloth or an elastic material. This makes it possible to allow the controller 100 to be fitted to the hand regardless of individual differences such as the size or shape of the hand. The mounting unit 10 includes an opening for allowing the thumb to pass through. When wearing the controller 100 on the hand, the user can easily wear the controller 100 by passing the thumb through the opening. A fastener, a button, or the like may be provided in the mounting unit 10 so that the fit state at the time of wearing can be adjusted.

In FIG. 1(A), the main body unit 11 is mounted to the mounting unit 10 on the back-side of the hand. The main body unit 11 includes a housing (first housing) 12, a measurement marker 14, and a sensor 1 (first sensor).

The housing 12 is mounted (fixed) on the surface of the mounting unit 10 on the back-side of the hand. The housing 12 includes a dielectric material such as resin, for example. When the user wears the controller 100 and opens the hand, a portion of the housing 12 is included in a space between the index finger and the thumb. In the housing 12, the portion included in the space is referred to as a protrusion 12A.

In FIG. 2, the sensor 1 and the measurement marker 14 are provided on a surface on the side opposite to the back of the hand among the surfaces of the protrusion 12A. Furthermore, as illustrated in FIGS. 1(A) and 1(B), the measurement markers 14 are respectively provided on the surface opposite to the back of the hand and a side surface of the hand among the surfaces of the housing 12. In FIG. 1(B), the measurement marker 14 is provided on the side surface on the thumb side, but a measurement marker may also be provided on the other side surface.

In FIG. 2, the sensor 1 detects information (first information) obtained by sensing at least one finger (first finger) included in a detection range of the sensor 1. As an example, the sensor 1 detects depth information indicating a distance (depth) to a finger included in the detection range. More specifically, the sensor 1 detects the depth information of each joint portion included in the at least one finger. In the present example, the sensor 1 is a depth sensor, and the sensor 1 detects depth information of each joint portion. Note that the information detected by the sensor 1 is not limited to the depth information, and may be any information as long as the information is useful for specifying the finger (or the position-attitude of each joint portion included in the finger). For example, an image including no distance (RGB image, black-and-white image, infrared image, and the like acquired by the camera) may be used. There may be a case where the attitude of the finger can be specified by analyzing the image by pattern recognition or the like. Note that, in a case where the attitude of the finger is specified by an infrared image, by arranging an infrared light emitting element (for example, an IRLED or the like having a wavelength of 940 nm) together with the sensor 1, the image of the finger can be stably acquired even in a dark place or a bright place exposed to direct sunlight, and the attitude can be specified. The light emission of the light emitting element may be performed only at an imaging timing of image acquisition by the sensor 1 such as a camera.

As an example, time of flight (ToF) can be used as the sensor 1. In addition, an arbitrary sensor can be used such as a sensor capable of detecting a distance such as a Light Detection and Ranging, Laser Imaging Detection and Ranging (LIDAR), a radar, or a stereo camera, or a monocular camera, a DVS camera, or an infrared camera. Furthermore, it is assumed that the sensor 1 requires a wide sensing area exceeding, for example, a horizontal view angle of 150 degrees, but in order to satisfy the requirement, instead of using a single sensor, it is also conceivable to arrange a plurality of sensors such as two or three sensors at the same position with angle differences.

The sensor 1 is included in the space between the index finger and the thumb in a state where the user opens the hand. More specifically, the sensor 1 is included in the space between the base of the index finger and the thumb.

The measurement marker 14 is a member for detecting the position and attitude (position-attitude) of the main body unit 11 from the head device to be mounted on the head of the user. As the measurement marker 14, an appropriate member can be used according to a method of calculating the position-attitude from the head device. As an example, a reflective marker for optical sensing can be used as the measurement marker 14. Specifically, the measurement marker 14 is a reflective member (for example, a retroreflective member) that reflects infrared rays. In this case, the head device can calculate the position-attitude of the main body unit 11 with reference to the coordinate system of the head device by emitting infrared rays and detecting reflected light from the measurement marker 14. In a case where the position-attitude is calculated from the head device on the basis of image analysis, a member having a color, a shape, or the like that is easily detected by image analysis may be used. Also, the measurement marker 14 may be a luminescent marker. Furthermore, the measurement marker 14 may be a two-dimensional marker or a three-dimensional marker. In a case where the two-dimensional marker or the three-dimensional marker is used, non-light emission or light emission may be detected by an RGB camera or a black-and-white camera, and in a case where the luminescent marker is used, detection can be performed even in a dark place. Alternatively, a marker emitting infrared light may be detected by an infrared camera. In a case where the infrared camera is used, by setting the wavelength of the band pass filter used for the camera and the LED for marker light emission to around 940 nm, the influence of external light such as sunlight hardly appears in the acquired image, and marker detection by image processing becomes easy.

In FIG. 1(A), a contact sensor 15 is provided on the back surface (surface facing the back of the hand) of the mounting unit 10 on the back-side of the hand. The contact sensor 15 is a sensor that detects a contact with a hand. The contact sensor 15 is electrically connected to the main body unit 11 via wiring (for example, wiring embedded in the belt) provided in the mounting unit 10. By detecting the contact with the back of the hand by the contact sensor 15, it is possible to detect that the user is wearing the controller 100.

As an example of the contact sensor 15, a capacitance sensor can be used. For example, the capacitance sensor includes an electrode and a dielectric body. When the controller 100 is worn, the dielectric body is sandwiched between the electrode and the back of the hand, and the contact with the palm can be detected by detecting a change in capacitance at this time.

The contact sensor 15 can also be provided on the surface of the housing 12, more specifically, on the surface on the back-side of the hand among the surfaces of the housing 12. In this case, an opening may be provided in the mounting unit 10, and the contact sensor 15 may directly make contact with the back of the hand via the opening. Alternatively, the contact sensor 15 may be sandwiched between the housing 12 and the mounting unit 10. In this case, the contact sensor 15 can detect an indirect contact with the back of the hand.

Furthermore, as another example of the sensing using the contact sensor, the contact between the tip of the index finger and the tip of the thumb may be detected. In this case, for example, two electrodes are arranged on the mounting unit 10 or the like in such a way as to directly make contact with the back of the hand, the palm, or with the base of the finger, or the like. One of the two electrodes is connected to the GND of a circuit, and an alternating-current voltage or the like is applied to the other electrode. Then, a change in at least one of the capacitance change and the resistance value due to the contact between the tips of the fingers is detected by a change in the voltage value of the electrode or the like. With this configuration, the contact between the tip of the index finger and the tip of the thumb is detected. A gesture command can be detected with respect to the operation of bringing the tip of the index finger and the tip of the thumb into contact with each other.

In FIG. 2, the sub unit 21 is mounted on the palm-side of the mounting unit 10. As an example, when the user wears the controller 100 on the hand, the sub unit 21 is located on a region including the hypothenar or a region on the hamate. Note that the sub unit 21 may be provided in a region other than the above-mentioned region. The sub unit 21 includes a housing (second housing) 22, a measurement marker 24, and a sensor (second sensor) 2.

The housing 22 is mounted (fixed) on the surface of the mounting unit 10 on the palm-side. As an example, the housing 22 includes a dielectric material such as resin. The sensor 2 and the measurement marker 24 are provided on a surface of the housing 22 on the side opposite to the palm, among surfaces of the housing 22.

The sensor 2 detects information (second information) obtained by sensing at least one finger (second finger) included in the detection range of the sensor 2. As an example, the sensor 2 detects depth information indicating a distance (depth) to a finger included in the detection range. More specifically, the sensor 2 detects the depth information of each joint portion included in the at least one finger. In the present example, the sensor 2 is a depth sensor, and the sensor 2 detects depth information of each joint portion. Note that the information detected by the sensor 2 is not limited to the depth information, and may be any information as long as the information is useful for specifying the attitude of the finger (or the position-attitude of each joint portion included in the finger). For example, an image including no distance (RGB image, black-and-white image, infrared image, and the like acquired by the camera) may be used. There may be a case where the attitude of the finger can be specified by analyzing the image by pattern recognition or the like. Note that, in a case where the attitude of the finger is specified by an infrared image, by arranging an infrared light emitting element (for example, an IRLED or the like having a wavelength of 940 nm) together with the sensor 2, the image of the finger can be stably acquired even in a dark place or a bright place exposed to direct sunlight, and the attitude can be specified. The light emission of the light emitting element may be performed only at an imaging timing of image acquisition by the sensor 2 such as a camera.

The sensor 2 is electrically connected to the main body unit 11 via wiring (for example, wiring embedded in the belt) provided in the mounting unit 10.

The sensor 2 is located, for example, on a region including the hypothenar (or a region on the hamate). This makes it possible to effectively detect the depth information of all or many fingers of the user regardless of the attitude of each finger.

As an example of the sensor 2, time of flight (ToF) can be used. In addition, an arbitrary sensor can be used such as a sensor capable of detecting a distance such as a Light Detection and Ranging, Laser Imaging Detection and Ranging (LIDAR), a radar, or a stereo camera, or a monocular camera, a DVS camera, or an infrared camera. Furthermore, it is assumed that the sensor 2 requires a wide sensing area exceeding, for example, a horizontal view angle of 100 degrees, but in order to satisfy the requirement, instead of using a single sensor, it is also conceivable to arrange a plurality of sensors such as two or three sensors at the same position at different angles.

The measurement marker 24 is a member for detecting the position-attitude (position-attitude of the hand) of the sub unit 21 from the head device to be mounted on the head of the user. As the measurement marker 24, a reflective marker for optical sensing can be used. A configuration example of the measurement marker 24 may be similar to that of the measurement marker 14.

A contact sensor 25 is provided on the back surface (surface facing the palm) of the mounting unit 10 on the palm-side. The contact sensor 25 is a sensor that detects a contact with the palm. The contact sensor 25 is electrically connected to the main body unit 11 via wiring (for example, wiring embedded in the belt) provided in the mounting unit 10. By detecting the contact with the palm by the contact sensor 25, it is possible to detect that the user is wearing the controller 100.

The configuration of the contact sensor 25 may be similar to that of the contact sensor 15. For example, a capacitance sensor can be used as the contact sensor 25. The capacitance sensor includes an electrode and a dielectric body. When the controller 100 is worn, the dielectric body is sandwiched between the electrode and the palm, and the contact with the palm can be detected by detecting a change in capacitance at this time. In addition to the capacitance sensor, another type of sensor such as a pressure sensor that detects a change in pressure when the sensor comes into contact with the palm may be used.

It may be configured such that an opening is provided in the mounting unit 10 and the contact sensor 25 directly makes contact with the palm via the opening. In addition, it may be configured such that the contact sensor 25 is sandwiched between the housing 22 and the mounting unit 10. In this case, the contact sensor 25 can detect the indirect contact with the palm via mounting unit 10.

Furthermore, as another example of the sensing using the contact sensor 25, as described in the description of the contact sensor 15, the contact between the tip of the index finger and the tip of the thumb may be detected by arranging two electrodes on the mounting unit 10 in such a way as to directly make contact with the palm or the like. By detecting the contact between the tip of the index finger and the tip of the thumb, it is possible to detect the gesture command with respect to the operation of bringing the tip of the index finger and the tip of the thumb into contact with each other.

Figure 3:
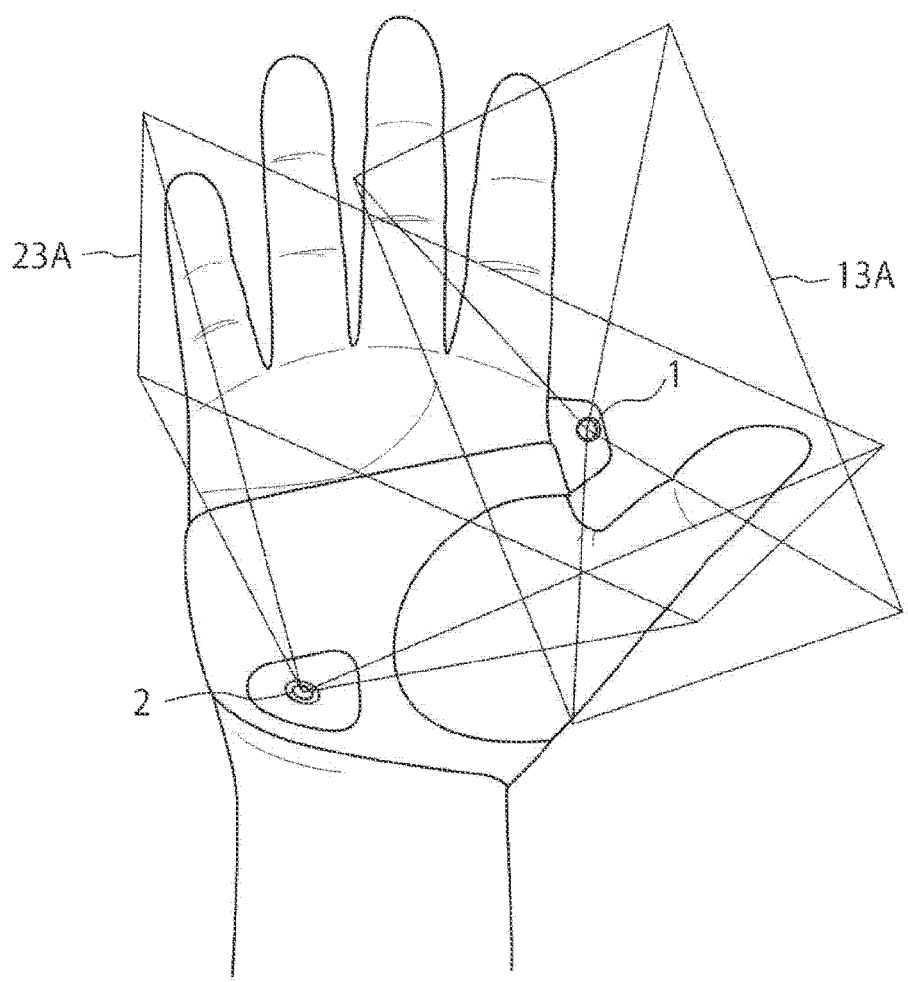
FIG. 3 is a diagram schematically illustrating an example of detection ranges of a sensor on a back-side of the hand and a sensor on the palm-side.

FIG. 3 schematically illustrates an example of detection ranges of the sensor 1 on the back-side of the hand and the sensor 2 on the palm-side. A detection range 13A of the sensor 1 and a detection range 23A of the sensor 2 each have a substantially quadrangular pyramid shape. Note that the shapes of the detection range 13A and the detection range 23A may be other shapes such as a cone. The finger (for example, each joint portion included in each finger) that can be detected in the detection range 13A and the detection range 23A can be changed according to the attitude (shape) of the finger.

Figure 4:
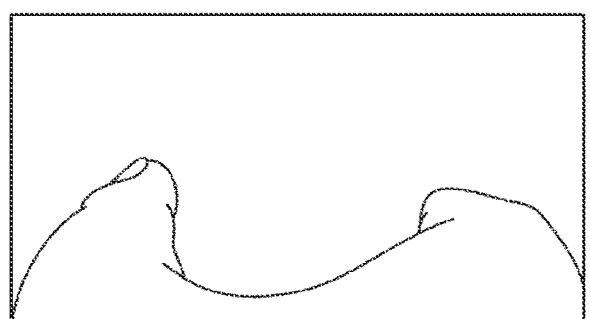
FIG. 4 is a diagram illustrating an example of depth information detected by a sensor on the back-side of the hand.
Figure 4:
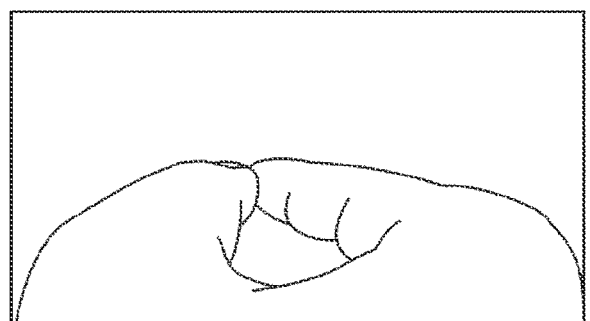

FIGS. 4(A) and 4(B) illustrate examples of the depth information detected by the sensor 1 on the back-side of the hand. The depth information in FIGS. 4(A) and 4(B) each is a depth image in which a depth value is stored in each pixel. FIG. 4(A) is an example of a depth image captured in a state where a space between the tip of the thumb and the tip of the index finger is widened. FIG. 4(B) is an example of a depth image captured in a state where the tip of the thumb and the tip of the index finger are in contact with each other. In both FIGS. 4(A) and 4(B), the thumb and the index finger are detected (imaged) without being obstructed by another finger. On the other hand, the depth information of the middle finger, the ring finger, and the little finger is not detected in both FIGS. 4(A) and 4(B). That is, the depth information of the middle finger, the ring finger, and the little finger cannot be detected in the attitude (shape) of each finger when the depth images of FIGS. 4(A) and 4(B) are captured. Note that there may be a case where the depth information (for example, depth information of at least one joint portion included in the finger) of at least one of the middle finger, the ring finger, and the little finger is detected by the sensor 1 depending on the attitude of each finger.

Figure 5:
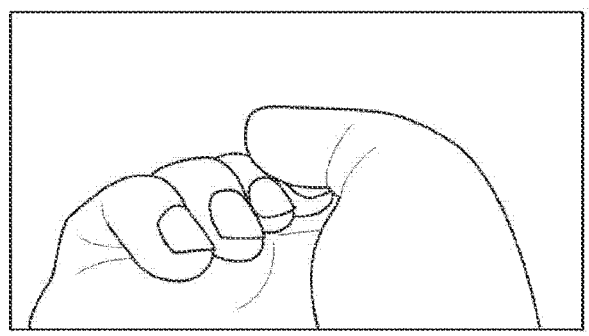
FIG. 5 is a diagram illustrating an example of depth information detected by a sensor on the palm-side.
Figure 5:
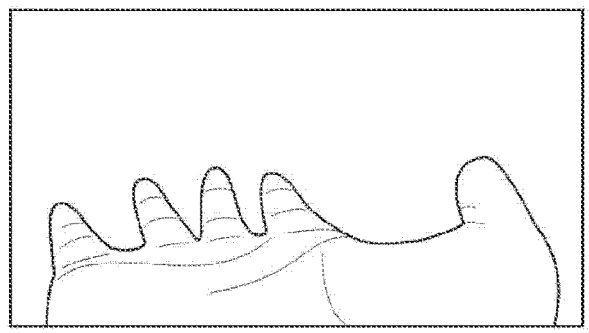

FIGS. 5(A) and 5(B) illustrate examples of the depth information detected by the sensor 2 on the palm-side. The depth information in FIGS. 5(A) and 5(B) each is a depth image in which a depth value is stored in each pixel. FIG. 5(A) is an example of a depth image captured in a state where the hand is closed. FIG. 5(B) is an example of a depth image captured in a state where the hand is opened. In FIG. 5(B), the depth information of all fingers (depth information of at least one joint portion included in each finger) is detected. In FIG. 5(A), most part of the index finger is obstructed by the thumb. From the depth information of FIG. 5(A), it may be difficult to recognize the attitude of the index finger (for example, the attitude of each joint of the index finger) with high accuracy.

In the housing 12 on the back-side of the hand, a sensor such as an inertial measurement unit (IMU), an actuator such as a vibrator 48, and a processing system are stored. The processing system performs processing based on signals detected by the sensor 1, the sensor 2, the contact sensor 15, the contact sensor 25, the IMU, and the like and signals received from the computer. A battery may be stored in the housing 12. In this case, the battery supplies an operating voltage to various types of sensors and each element in the housing 12. The operating voltage may be supplied via wiring 17 (see FIG. 1) between the main body unit 11 and the computer. In the present embodiment, it is assumed that the operating voltage is supplied from the computer via the wiring 17.

Figure 6:
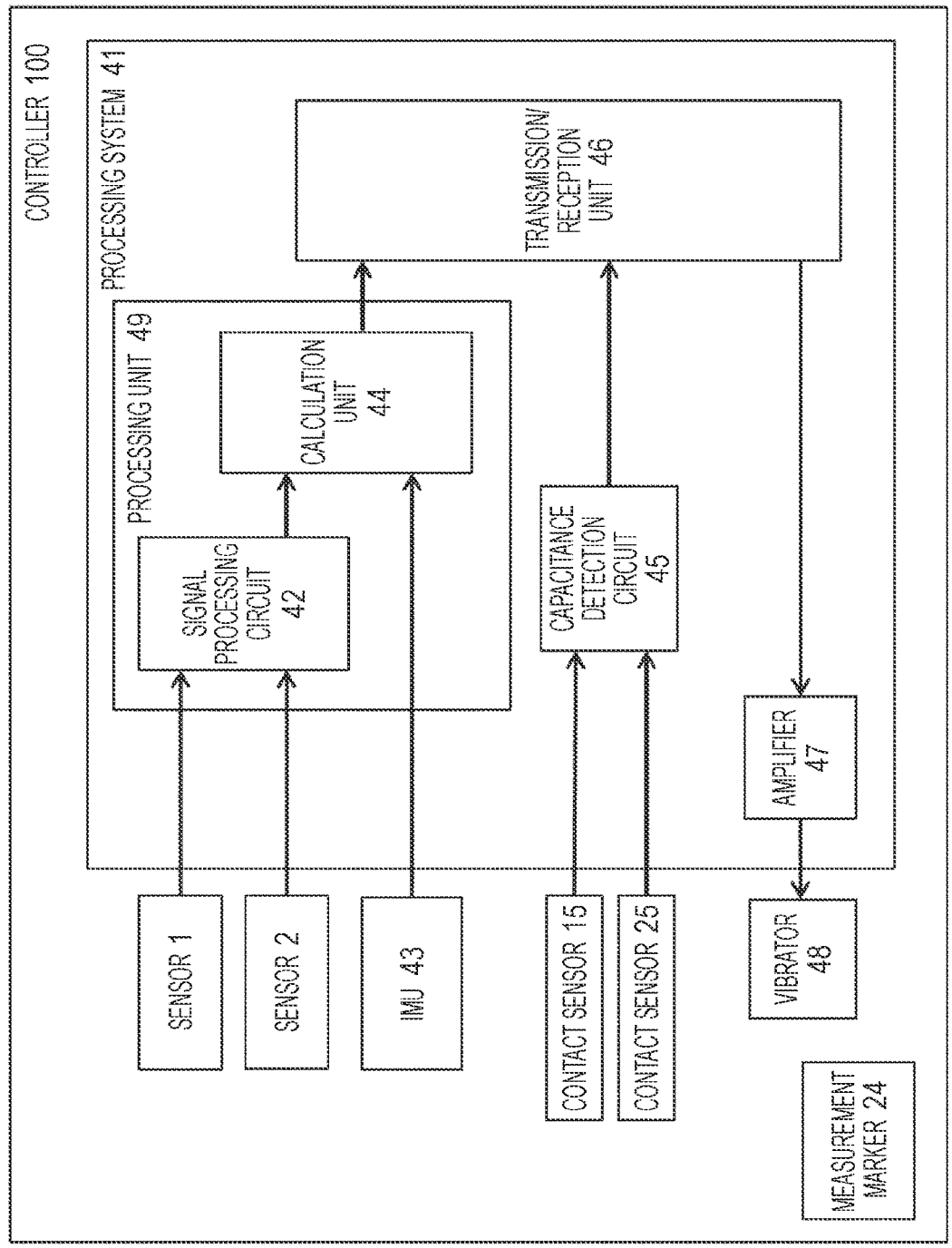
FIG. 6 is a functional block diagram of the controller according to the present embodiment.

FIG. 6 is a functional block diagram of the controller 100 illustrated in FIGS. 1 and 2. The controller 100 includes a sensor 1, a sensor 2, a contact sensor 15, a contact sensor 25, a measurement marker 14, a processing system 41, an IMU 43, and a vibrator 48. The processing system 41, the IMU 43, and the vibrator 48 are disposed in the housing 12.

The processing system 41 includes a processing unit 49 (signal processing circuit 42, calculation unit 44), a capacitance detection circuit 45, a transmission/reception unit 46, and an amplifier 47. The processing system 41 includes a hardware circuit, a storage device, and the like. The hardware circuit includes a processing circuit such as a CPU, a digital signal processor (DSP), an application specific integrated circuit (ASIC), a field-programmable gate array (FPGA), or a combination thereof. The storage device includes an arbitrary recording medium such as a volatile memory, a rewritable nonvolatile memory, a read on memory (ROM), a magnetic storage memory, a hard disk, and an optical disk. The processing system includes one chip or a plurality of chips as an example. At least one function of the elements 42, 44, 45, 46, 47, and 49 may be implemented by a processor such as a CPU executing an information processing program that is a computer program.

The signal processing circuit 42 acquires a detection signal (depth information) from the sensor 1. The signal processing circuit 42 acquires a detection signal (depth information) from the sensor 2. The signal processing circuit 42 includes a first acquisition unit that acquires depth information, which is an example of first information, from the sensor 1 and a second acquisition unit that acquires depth information, which is an example of second information, from the sensor 2.

The signal processing circuit 42 calculates information (attitude information) for specifying the attitude of five fingers or at least one finger on the basis of the depth information of the sensor 1. More specifically, position-attitude information for specifying the position-attitude of each joint portion of each finger is calculated. The position-attitude information of each joint portion of each finger calculated on the basis of the depth information of the sensor 1 is referred to as position-attitude information 1. The position-attitude information 1 is position-attitude information in a local coordinate system based on the position of the sensor 1.

The signal processing circuit 42 calculates information (attitude information) for specifying the attitude of five fingers or at least one finger on the basis of the depth information of the sensor 2. More specifically, position-attitude information for specifying the position-attitude of each joint portion of each finger is calculated. The position-attitude information of each joint portion of each finger calculated on the basis of the depth information of the sensor 2 is referred to as position-attitude information 2. The position-attitude information 2 is position-attitude information in a local coordinate system based on the position of the sensor 2.

In order to calculate the position-attitude information of each joint portion of each finger on the basis of the depth information of the sensor 1 or the depth information of the sensor 2, a model generated by machine learning can be used. For example, a regression model that regresses the position-attitude information of each joint portion of each finger from the depth information can be used. Examples of the regression model include a neural network (for example, deep neural network (DNN)), a nonlinear regression model, and a support vector machine (SVM), or the like.

The signal processing circuit 42 provides the position-attitude information 1 of each joint portion of each finger to the calculation unit 44. The signal processing circuit 42 provides the position-attitude information 2 of each joint portion of each finger to the calculation unit 44. Note that, in a case where there is a joint portion of a finger whose position-attitude cannot be calculated, it is only required that information indicating that the position-attitude cannot be calculated is included in the position-attitude information 1 or the position-attitude information 2. Note that, even in a case where none of the depth information of the sensor 1 and the sensor 2 includes the depth of a certain joint portion of a certain finger, the position-attitude of the joint portion may be estimated by a model such as a neural network tag.

An inertial measurement unit (IMU) 43 includes a gyro sensor and an acceleration sensor as an example. The gyro sensor detects angular velocities of the three axes with respect to the reference axis. The acceleration sensor detects accelerations of three axes with respect to the reference axis. The IMU 43 may include a three-axis magnetic sensor.

The calculation unit 44 calculates the position (local position) and the attitude (direction) of the main body unit 11 on the basis of the detection signal of the IMU 43. That is, the position-attitude of the hand of the user is calculated. Furthermore, the calculation unit 44 may calculate at least one of the moving distance and the speed of the main body unit 11.

The calculation unit 44 determines the position-attitude information of each joint portion of each finger with respect to the main body unit 11 on the basis of the position-attitude information 1 of each joint portion of each finger and the position-attitude information 2 of each joint portion of each finger. The position of the main body unit 11 is detected by the head device (or the IMU 43). The position of the main body unit 11 may be treated as the position of the sensor 1 as an example. The sensor 1 is fixed to the housing 12, and a positional relationship with the housing 12 is constant. On the other hand, since the sensor 2 is connected to the sensor 1 (housing 12) via the mounting unit 10, the relative position-attitude between the coordinate systems of the sensor 1 and the sensor 2 is inconstant. Specifically, the shape of the belt at the time of wearing changes depending on the difference in size and shape of the user's hand and the difference in the wearing position of the belt. As a result, the relative position-attitude between the coordinate systems of the sensor 1 and the sensor 2 changes. Therefore, the relative position-attitude between the coordinate systems of the sensor 1 and the sensor 2 is calculated, and the position-attitude information 2 is converted into the coordinate system of the sensor 1 on the basis of the calculated relative position-attitude. A method of conversion is described below.

Obtaining the relative position-attitude between the coordinate systems of the sensor 1 and the sensor 2 is regarded as synonymous with obtaining an equation for converting the three-dimensional vector of the coordinate system of the sensor 2 into the three-dimensional vector of the coordinate system of the sensor 1 using a rotation matrix R and a translation vector T.

Since the detection range of the sensor 1 and the detection range of the sensor 2 overlap each other, there is a joint portion (target joint portion) detected from both the sensor 1 and the sensor 2. For example, the joint (distal phalanx) at the tip of the index finger is often detected by both the sensors 1 and 2.

The coordinate system of the sensor 1 is a coordinate system 1, the coordinate system of the sensor 2 is a coordinate system 2, and a coordinate system of the distal phalanx of the index finger is a coordinate system 3.

Figure 8:
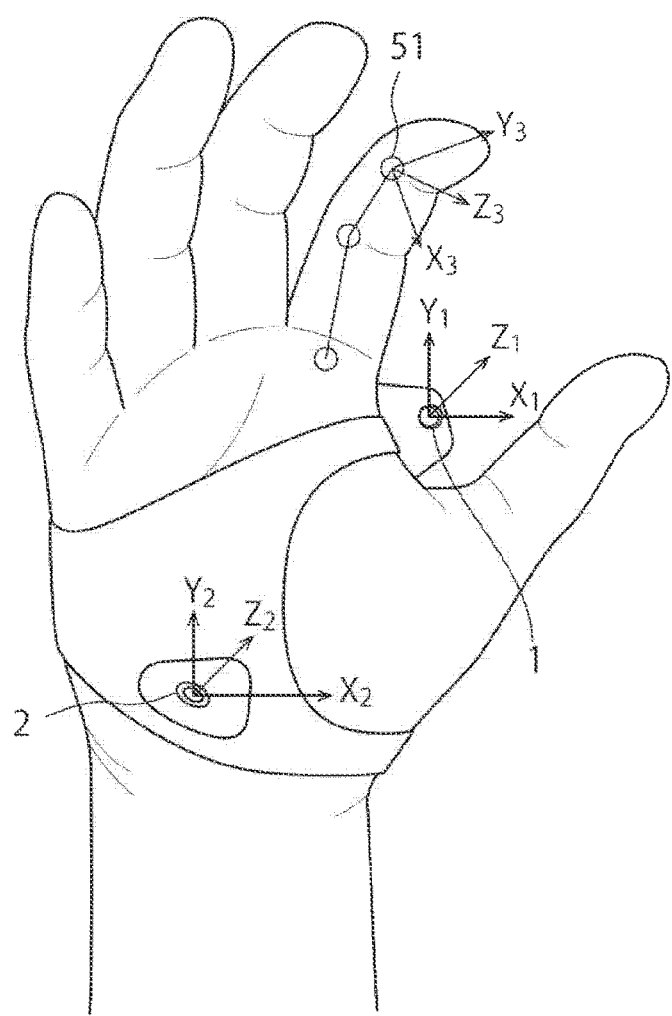
FIG. 8 is a diagram illustrating an example of a coordinate system of each of the two sensors and a coordinate system of a distal phalanx of an index finger.

FIG. 8 illustrates an example of the coordinate system 1 of the sensor 1, the coordinate system 2 of the sensor 2, and the coordinate system 3 of a distal phalanx 51 of the index finger. Note that, in FIG. 8, joint portions other than the distal phalanx 51 of the index finger are also indicated by circle symbols.

The relationship between the coordinate system 1 of the sensor 1 and the coordinate system 3 of the distal phalanx of the index finger is expressed by Equation (1).

[Equation 1]

$$\begin{pmatrix} x3 \\ y3 \\ z3 \end{pmatrix} = Ra \begin{pmatrix} x1 \\ y1 \\ z1 \end{pmatrix} + Ta \quad (1)$$

The relationship between the coordinate system 2 of the sensor 2 and the coordinate system 3 of the distal phalanx of the index finger is expressed by Equation (2).

[Equation 2]

$$\begin{pmatrix} x3 \\ y3 \\ z3 \end{pmatrix} = Rb \begin{pmatrix} x2 \\ y2 \\ z2 \end{pmatrix} + Tb \quad (2)$$

Equation (3) is obtained from Equation (1) and Equation (2).

[Equation 3]

$$Ra \begin{pmatrix} x1 \\ y1 \\ z1 \end{pmatrix} + Ta = Rb \begin{pmatrix} x2 \\ y2 \\ z2 \end{pmatrix} + Tb \quad (3)$$

Equation (3) can be transformed into Equation (4).

[Equation 4]

$$\begin{pmatrix} x1 \\ y1 \\ z1 \end{pmatrix} = R_a^{-1} \cdot Rb \begin{pmatrix} x2 \\ y2 \\ z2 \end{pmatrix} + R_a^{-1} \cdot (Tb - Ta) \quad (4)$$

When $Ra^{-1} \cdot Rb$ in Equation (4) is R and $Ra^{-1} \cdot (Tb-Ta)$ is T, the following Equation (5) is obtained.

[Equation 5]

$$\begin{pmatrix} x1 \\ y1 \\ z1 \end{pmatrix} = R \begin{pmatrix} x2 \\ y2 \\ z2 \end{pmatrix} + T \quad (5)$$

Equation (5) is an equation for converting the three-dimensional vector of the coordinate system 2 of the sensor 2 into the three-dimensional vector of the coordinate system 1 of the sensor 1 using the rotation matrix R and the translation vector T. In this manner, the relative position-attitude between the coordinate systems of the sensor 1 and the sensor 2 can be obtained.

The calculation unit 44 converts the position-attitude information 2 into the coordinate system 1 of the sensor 1 on the basis of the relationship of Equation (5). Then, the position-attitude information of each joint portion of each finger (for example, a finger included in the finger detected by the sensor 1 and the finger detected by the sensor 2) is determined on the basis of the converted position-attitude information 2 and the position-attitude information 1. As an example, for the joint portion of the finger included only in one of the position-attitude information 1 and the converted position-attitude information 2, the position-attitude information of the joint portion of the finger included in the one is used. For the joint portion of the finger included in both, an average of both pieces of position-attitude information may be used, or either one may be adopted. The calculation unit 44 provides the position-attitude information of each joint portion of each finger to the transmission/reception unit 46. Here, the calculation unit 44 determines the position-attitude information of each joint portion of each finger on the basis of the position-attitude information 1 and the position-attitude information 2, but the position-attitude information 1 and the position-attitude information 2 may be transmitted to the computer (see FIGS. 9 and 10), and the position-attitude information of each joint portion of each finger may be determined on the computer side.

Since the relative position-attitude between the coordinate systems of the sensor 1 and the sensor 2 changes from moment to moment with the movement of the finger, the processing of obtaining parameters by the calculation as in Equations (1) to (5) described above may be performed at fixed time intervals.

Figure 7:
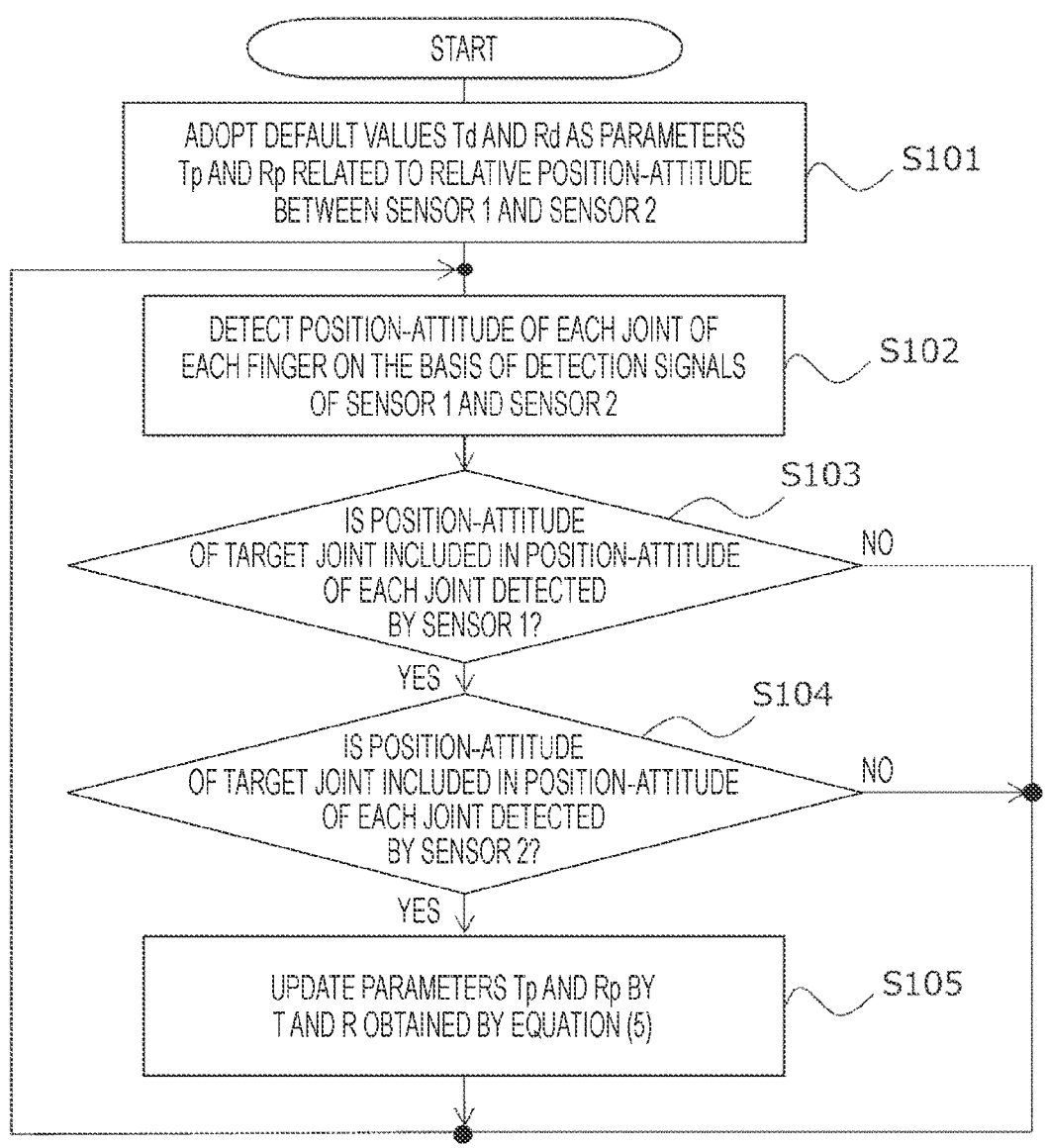
FIG. 7 is a flowchart illustrating an example of an operation of calculating a relative position-attitude between coordinate systems of two sensors.

FIG. 7 is a flowchart illustrating an example of the operation of calculating the relative position-attitude between the coordinate systems of the sensor 1 and the sensor 2 at fixed time intervals. First, default values Td and Rd are set as parameters Tp and Rp associated with the relative position-attitude between the coordinate systems of the sensor 1 and the sensor 2 (S101). The position-attitude of each joint portion of each finger is detected on the basis of the detection signals (depth information) of the sensor 1 and the sensor 2 (S102). It is determined whether the position-attitude of the target joint portion (for example, the distal phalanx of the index finger) is included in the position-attitude of each joint portion detected by the sensor 1 (S103). In a case where the position-attitude of the target joint portion is included (YES), it is determined whether the position-attitude of the target joint portion (for example, the distal phalanx of the index finger) is included in the position-attitude of each joint portion detected by the sensor 2 (S104). In a case where the position-attitude of the target joint portion is included (YES), the parameters Tp and Rp are updated by T and R obtained by Equation (5) (S105). Thereafter, the processing returns to step S102. In a case where it is determined in step S103 or step S104 that the position-attitude of the target joint portion is not included, the processing returns to step S102 without updating the parameters Tp and Rp.

The amount of change in the relative position-attitude during described above use of the controller 100 is usually smaller than the amount of change described above caused by the shape and size of the user's hand, the difference in the mounting position of the controller 100, and the like. Therefore, once after the user has worn the controller 100, the relative position-attitude can be considered to be constant. In this case, after the user has worn the controller 100, the user is caused to take an attitude by which the sensor 1 and the sensor 2 can commonly detect the target joint portion (for example, the distal phalanx of the index finger). For example, a message for causing the user to take the attitude may be presented via a voice message or an image provided by the head device in the initial setting mode. While the user takes the attitude, processing of calculating the relative position-attitude between the coordinate systems of the sensor 1 and the sensor 2 is performed. According to this, since the target joint portion can be reliably detected by both the sensors 1 and 2, there is no detection loss and efficiency is achieved.

In the configuration of FIG. 2, the sensor 2 is provided in a housing (a structure) different from the sensor 1, but the sensor 2 may be provided in the same housing as the sensor 1. This makes it possible to suppress a change in the position-attitude of the sensor 2 with respect to the main body 11. Specifically, for example, a configuration is conceivable in which the housing of the main body 11 in FIG. 1 is extended from the back of the hand to the palm on the little finger side, and the sensor 2 is disposed at the position illustrated in FIG. 2. Since the sensor 2 is disposed on the same housing as the sensor 1, a change in the relative position-attitude between the sensor 1 and the sensor 2 can be suppressed. Therefore, it is not necessary to perform calculation using Equation (5) that would be affected by erroneous sensing of a finger joint, and thus, it is possible to improve the detection accuracy of the position-attitude of each joint of the finger.

In FIG. 6, the capacitance detection circuit 45 acquires a detection signal from the contact sensor 15. Furthermore, the capacitance detection circuit 45 acquires a detection signal from contact sensor 25. The capacitance detection circuit 45 determines whether the user has worn the controller 100 on the basis of at least one of the detection signals of the contact sensor 15 and the contact sensor 25. As an example, in a case where the amount of change in capacitance is equal to or greater than a threshold value in both or any one of the contact sensor 15 and the contact sensor 25, it is determined that the user has worn the controller 100. Alternatively, in a case where the value of the electrostatic capacitance becomes equal to or larger than the threshold value in both or any one of the contact sensor 15 and the contact sensor 25, it is determined that the user has worn the controller 100. In a case where it is determined that the user has worn the controller 100, the capacitance detection circuit 45 provides a wearing detection signal to the transmission/reception unit 46. In a case where it is determined that the user has not worn the controller 100, the wearing detection signal is not provided to the transmission/reception unit 46, or a non-wearing detection signal is provided to the transmission/reception unit 46.

Figure 9:
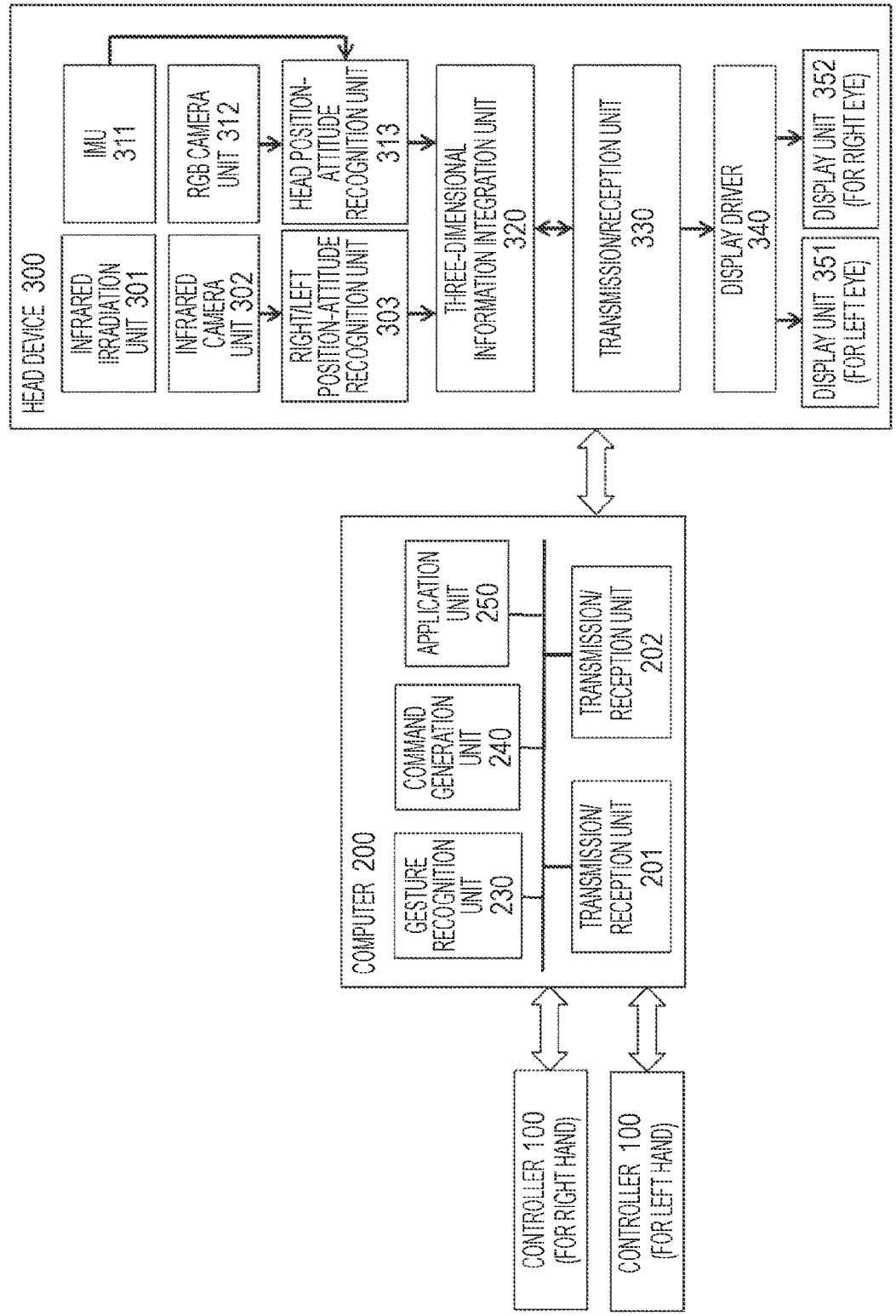
FIG. 9 is a block diagram of a computer system including a controller for a right hand, a controller for a left hand, a computer, and a head device.
Figure 10:
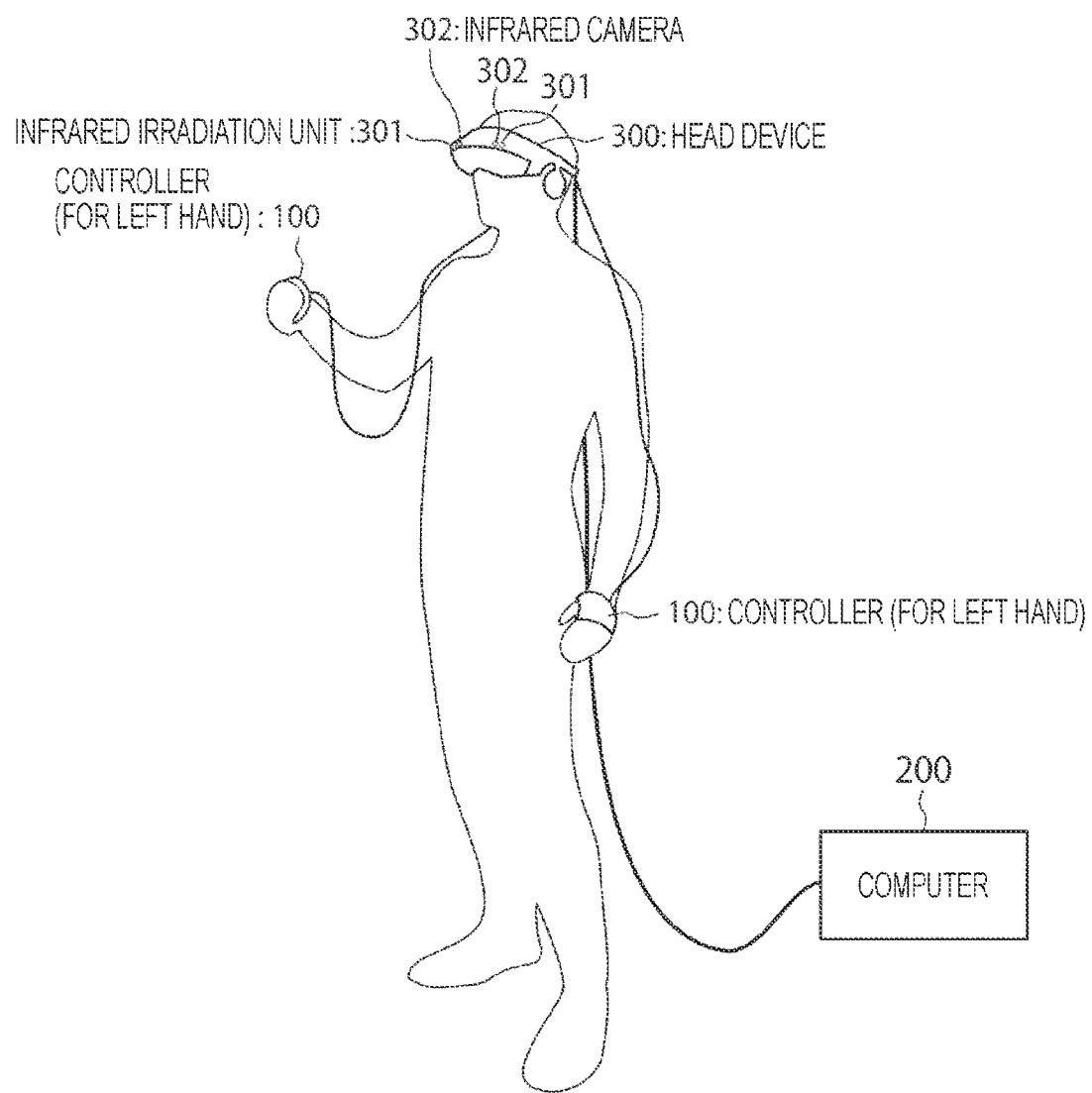
FIG. 10 is a diagram illustrating an example in which a user wears the controller for the right hand, the controller for the left hand, and the head device.

The transmission/reception unit 46 transmits the position-attitude information (position-attitude information of the hand) of the main body unit 11 provided from the calculation unit 44 to the computer (see FIGS. 9 and 10). The transmission/reception unit 46 transmits information (for example, position-attitude information of each joint portion of each finger) for specifying the attitude of each finger provided from the calculation unit 44 to the computer. The transmission/reception unit 46 transmits the wearing detection signal provided from the calculation unit 44 to the computer. The transmission/reception unit 46 transmits the non-wearing detection signal provided from the calculation unit 44 to the computer. In a case where a control signal for the vibrator 48 is received from the computer, the transmission/reception unit 46 provides the control signal to the amplifier 47.

The amplifier 47 amplifies the control signal for the vibrator 48 provided from the transmission/reception unit 46 and provides the amplified control signal to the vibrator 48.

The vibrator 48 is a vibrator that vibrates according to an input signal. The vibrator 48 vibrates according to the control signal provided from the amplifier 47. The vibration of the vibrator 48 is perceived as a tactile sensation by the hand of the user wearing the controller 100. This enables the user to acquire, by tactile sense, feedback corresponding to an instruction made as a gesture (hand sign) generated using the finger and the hand.

FIG. 9 is a block diagram of a computer system including a controller 100 for the right hand, a controller 100 for the left hand, a computer 200, and a head device 300.

FIG. 10 illustrates an example of a state of the user wearing the controller 100 for the right hand and the controller 100 for the left hand and the head device 300 in the configuration example of the computer system of FIG. 9.

In FIG. 10, in the computer 200, the controller 100 for the right hand and the controller 100 for the left hand are connected in a wired manner. The computer 200 is connected to the head device 300 in a wired manner. The wiring of the controller 100 for the right hand and the wiring of the controller 100 for the left hand are integrated with the wiring of the head device 300 at the rear portion of the head device 300 and connected to the computer 200. Note that the computer 200 and the controller 100 for the right hand and the controller 100 for the left hand may be connected in a wireless manner. The computer 200 and the head device 300 may be connected in a wireless manner.

The controller 100 for the right hand and the controller 100 for the left hand have the configurations illustrated in FIG. 6 described above. In the following description, when the controller 100 is described, it may refer to either of the controller 100 for the left hand and the controller 100 for the right hand, or both of the controllers 100. Furthermore, when described as a hand, it may refer to either of the left hand and the right hand, or both of them.

In the computer system of FIG. 9, a real coordinate system that is a coordinate system in a real space is set in advance with a reference point as an origin. The reference point may be an arbitrary position or a predetermined position in the real space, or may be an arbitrary position or a predetermined position included in the head device 300.

The head device 300 includes an infrared irradiation unit 301, an infrared camera unit 302, a right/left hand position-attitude recognition unit 303, an IMU 311, an RGB camera unit 312, a head position-attitude recognition unit 313, a three-dimensional information integration unit 320, a transmission/reception unit 330, a display driver 340, a left-eye display unit 351, and a right-eye display unit 352. The elements 303, 313, 320, 330, and 340 include a hardware circuit, a storage device, and the like. The hardware circuit includes a processing circuit such as a CPU, a DSP, an ASIC, an FPGA, or a combination thereof. The storage device includes an arbitrary recording medium such as a volatile memory, a rewritable nonvolatile memory, a ROM, a magnetic storage memory, a hard disk, and an optical disk. At least one function of the elements 303, 313, 320, 330, and 340 may be implemented by a processor such as a CPU executing an information processing program that is a computer program.

The head device 300 is a device that is worn on the head of the user and provides information to the user via the left-eye display unit 351 and the right-eye display unit 352 during the operation. In the present embodiment, it is assumed that the head device 300 is a pair of augmented reality (AR) glasses that outputs a field of view image obtained by combining a part of an image constituting a virtual space with an image of the real world obtained via the RGB camera unit 312.

Note that the head device 300 may be a pair of virtual reality (VR) glasses that displays an image for the right eye and an image for the left eye on the non-transmissive display units 351 and 352, respectively, and causes the images to be recognized as three-dimensional images on the basis of the parallax of both eyes of the user. Furthermore, the head device 300 may be a pair of smart glasses that presents digital information to the non-transmissive display units 351 and 352. The display units 351 and 352 are, for example, display devices such as a liquid crystal display or an organic EL monitor.

In the head device 300, two infrared irradiation units 301 and two infrared camera units 302 are provided (see FIG. 10).

The infrared irradiation unit 301 is, for example, a light emitting diode (LED) that emits infrared rays.

The two infrared camera units 302 read infrared rays emitted by at least one infrared irradiation unit 301 and reflected by the measurement marker 14 of the controller 100. The infrared camera units 302 generate an infrared image on the basis of the read infrared rays. The right/left hand position-attitude recognition unit 303 calculates the position or the position-attitude of the hand by triangulation using the two infrared camera units 302 and the measurement marker 14 of the target hand (main body unit 11). It is possible to distinguish between the right hand and the left hand by making the arrangement of the measurement marker 14 of the hand body different between the left hand and the right hand. Since infrared rays are used, reflection from the measurement marker 14 can be obtained even outdoors. In addition, the detection range of the hand can be widened by providing a plurality of infrared irradiation units 301. Furthermore, as another operation example, the two infrared irradiation units 301 are set for the right hand and the left hand, respectively, and the two infrared camera units 302 are set for the right hand and the left hand, respectively. The infrared camera unit 302 of the right hand (or left hand) may recognize the position-attitude of the right hand (or left hand) by analyzing the infrared image obtained by the irradiation of the infrared irradiation unit 301 corresponding to the right hand (or left hand).

The IMU 311 includes a gyro sensor and an acceleration sensor as an example. The configuration of the IMU 311 is similar to that of the IMU in the controller 100 described above.

The RGB camera unit 312 images a space in the real world at regular time intervals, and acquires RGB image data. The RGB camera unit 312 is provided, for example, in front of the housing of the head device 300.

The head position-attitude recognition unit 313 recognizes the position-attitude of the head (head device 300) on the basis of the detection signal of the IMU 311. The head position-attitude recognition unit 313 uses the coordinate system based on the recognized position-attitude as the coordinate system of the real space, and converts the image of the RGB camera 212 from the camera coordinate system into the coordinate system of the real space.

The three-dimensional information integration unit 320 performs integration processing on the basis of the image of the real space after the conversion and information provided from the computer 200 (for example, a virtual image or the like to be displayed superimposed on the image of the real space), and generates three-dimensional image information to be presented to the user for the left eye and the right eye. In the integration processing, the positions or the position-attitudes of the left and right hands obtained by the right/left hand position-attitude recognition unit 303 may be used. For example, a virtual image imitating a hand may be integrated at a position where the hand of the user exists. The virtual image imitating the hand may be included in the information provided from the computer 200, or may be stored in advance in the memory device of the head device 300, and the virtual image may be retrieved from the memory device. The attitude of the hand of the virtual image may be changed according to the attitude of the hand. In this case, a plurality of virtual images of the hand corresponding to the attitude may be prepared, or a change in the attitude may be calculated and rendered.

The transmission/reception unit 330 transmits the position or position-attitude information of the right and left hands acquired by the right/left hand position-attitude recognition unit 303 to the computer 200. Furthermore, the transmission/reception unit 330 provides the display driver 340 with image information generated by the three-dimensional information integration unit 320. The transmission/reception unit 330 may transmit the image information generated by the three-dimensional information integration unit 320 to the computer 200.

The display driver 340 generates a drive signal for displaying an image on the left-eye display unit 351 on the basis of the left-eye image information. The display driver 340 generates a drive signal for displaying an image on the right-eye display unit 352 on the basis of the image information for the right eye. The display driver 340 provides these generated drive signals to the left-eye display unit 351 and the right-eye display unit 352.

The left-eye display unit 351 and the right-eye display unit 352 display an image on a screen on the basis of a drive signal provided from the display driver 340. The images displayed on the left-eye display unit 351 and the right-eye display unit 352 are visually recognized by the user wearing the head device 300.

The computer 200 is a mobile terminal such as a personal computer (desktop type, notebook type) or a smartphone, or an information device terminal such as a tablet device. Although the configuration in which the computer 200 is provided outside the head device 300 is illustrated, the computer 200 and the head device 300 may be integrally configured. For example, the computer 200 may be built in the head device 300.

The computer 200 includes a transmission/reception unit 201, a transmission/reception unit 202, a gesture recognition unit 230,
a command generation unit 240, and an application unit 250. In addition, an input unit to which the user inputs data, an instruction, or the like, an output unit that outputs information to the user, and the like may be provided. The elements 201, 202, 230, 240, and 250 include, for example, a hardware circuit, a storage device, and the like. The hardware circuit includes a processing circuit such as a CPU, a DSP, an ASIC, an FPGA, or a combination thereof. The storage device includes an arbitrary recording medium such as a volatile memory, a rewritable nonvolatile memory, a ROM, a magnetic storage memory, a hard disk, and an optical disk. At least one function of the elements 201, 202, 230, 240, and 250 may be implemented by a processor such as a CPU executing an information processing program that is a computer program. The computer 200 may be configured as a single computer, or may be configured as a system including a plurality of computer devices connected to each other. The computer 200 may exist as a server in a wide area network such as a cloud.

The transmission/reception unit 201 transmits and receives signals to and from the controller 100 according to a predetermined communication scheme. The transmission/reception unit 202 transmits and receives signals to and from the head device 300 according to a predetermined communication scheme. As each predetermined communication method, an arbitrary method such as a dedicated communication method, serial communication such as a universal serial bus (USB), a wireless local area network (LAN), Bluetooth, or infrared communication can be used.

The computer 200 acquires, from the controller 100 via the transmission/reception unit 201, information (position-attitude information of each joint portion of each finger or time-series data of the position-attitude information) for specifying the attitude or the movement of each finger as information associated with the attitude or the movement of the user's finger. Furthermore, the computer 200 acquires, from the head device 300 via the transmission/reception unit 202, information on the position or position-attitude of the hand in the coordinate system of the real space or time-series data thereof. There may be a case where information on the position or position-attitude of the hand cannot be acquired from the head device 300 because the main body unit 11 of the controller 100 is out of the irradiation range of the infrared irradiation unit 301. In this case, the computer 200 may grasp the position or position-attitude of the hand (main body unit 11) in the coordinate system of the real space on the basis of the information on the position or position-attitude of the hand (main body unit 11) acquired from the controller 100 via the transmission/reception unit 201. More specifically, the position of the hand (main body unit 11) in the coordinate system of the real space is specified by updating the amount of change in position from the latest position information received from the head device 300 on the basis of the position information received from the controller 100. The attitude of the hand (main body unit 11) is specified using attitude information received from controller 100.

The gesture recognition unit 230 recognizes a gesture (hand sign) of the user on the basis of the position-attitude information of each joint portion of each finger and the position or position-attitude information of the hand. The attitude (shape) of the finger can be specified from the position-attitude of each joint portion of the finger. In addition, if the position-attitude for a plurality of times is specified for each finger, the movement of each finger can be specified.

The command generation unit 240 generates an operation command for the application in response to the recognized hand sign. For example, the gesture recognition unit 230 identifies the hand sign of the user on the basis of the attitude (shape) of each finger and the position-attitude of the hand. Specifically, a table in which the attitude of each finger, the position or position-attitude of the hand, and the hand sign are associated with each other is prepared, and the corresponding hand sign is specified from the table. The combination of the attitude (shape) of the finger and the position or position-attitude of the hand, or the time-series data of the combination can be recognized as a hand sign of various actions such as pointing, pushing, opening, grasping, turning, and throwing.

As an example in which the command generation unit 240 generates the operation command in response to the hand sign, there is a case where a command to open a menu is generated in a case where the hand sign to open the menu is recognized. In addition, in a case where a hand sign indicating selection at a position of a certain item is recognized in the opened menu, a command to open a detail screen of the item may be generated. Furthermore, in a case where a predetermined hand sign is recognized in a certain situation, a command for vibrating the controller 100 of the user may be generated. For example, in a case where a virtual image of a cup or an image of the real world is displayed on the head device 300, it is assumed that a hand sign holding the cup is identified. In this case, in order to notify the user that the user has grasped the cup, a command may be generated to vibrate in a pattern corresponding to a target (for example, the cup or the like) to which the user has performed the hand sign or to the hand sign. The display of the cup in the real-world image can be performed using image analysis such as semantic segmentation. In this case, the command generation unit 240 may have a function of performing image analysis.

The application unit 250 provides the user with an application service (for example, entertainment such as a game) using the controller 100 and the head device 300. For example, in a case where execution instruction data of an application is received from the user, the application unit 250 determines whether a wearing detection signal is received for at least one or both of the contact sensor 15 and the contact sensor 25 from the controller 100, and in a case where the wearing detection signal is received, the application unit starts execution of the application. The execution instruction data may be directly input to the computer 200 by the user via the input unit. Alternatively, the user may input the execution instruction data to the head device 300 or the controller 100, and receive the execution instruction data from the head device 300 or the controller 100.

The application unit 250 acquires an operation command for the application from the command generation unit 240 and executes the acquired operation command. For example, in a case where an operation command to open a menu is executed, instruction data instructing to display a virtual image representing the menu is transmitted to the three-dimensional information integration unit 320 of the head device 300. The position at which the virtual image is displayed may be a predetermined position, or may be a position determined according to the attitude of the user's finger or the position-attitude of the user's hand when the user's hand sign is recognized. The instruction data may include a position at which the virtual image is displayed. Furthermore, in a case where a command to vibrate the controller 100 is executed, the application unit 250 generates a control signal for vibrating the vibrator using a driver for the vibrator. The application unit 250 transmits the generated control signal of the vibrator to the controller 100 via the transmission/reception unit 201.

The configuration illustrated in FIG. 9 is an example, and various variations are possible. For example, the head device 300 may be provided with a speaker and a sound driver. The application unit 250 of the computer 200 transmits, to the sound driver, instruction data instructing output of a sound corresponding to the recognized hand sign. The sound driver generates a control signal on the basis of the instruction data and provides the control signal to the speaker. The speaker outputs the sound or the voice corresponding to the control signal.

Furthermore, a light emitting unit such as an LED lamp that provides visual feedback to the controller 100 may be provided. The application unit 250 of the computer 200 generates a control signal for emitting light corresponding to the recognized hand sign using a driver for a light emitting element, and transmits the control signal to the controller 100. The light emitting element of the controller 100 emits light in response to the control signal.

As described above, according to the present embodiments, the sensor 1 arranged in the space between the thumb and the index finger detects the depth information including the distance to the finger in the detection area, and the sensor 2 arranged on the palm detects the depth information including the distance to the finger in the detection area. This increases the possibility of detecting each finger of the user by at least one of the sensors, so that the attitude of each finger can be detected more reliably. For example, even if the index finger is hidden by the thumb in the depth information detected by the sensor 2, the index finger is not hidden by the thumb in the depth information detected by the sensor 1. Since the first sensor and the second sensor can complement each other in such a manner, the possibility of correctly detecting the attitude of each finger can be increased.

Furthermore, according to the present embodiments, the mounting unit to be worn by the user is configured of a flexible material, and it is sufficient if a small thin sub unit is provided on the palm-side of the user, so that the user can easily perform an action of moving each finger or holding an object.

Furthermore, according to the present embodiments, since the vibrator is provided in the main body unit 11, feedback can be given to the user by tactile sense.

Note that the above-described embodiments illustrate examples for embodying the present disclosure, and the present disclosure can be implemented in various other modes. For example, various modifications, substitutions, omissions, or combinations thereof can be made without departing from the gist of the present disclosure. Such modifications, substitutions, omissions, and the like are also included in the scope of the present disclosure and are similarly included in the invention described in the claims and the equivalent scope thereof.

Furthermore, the effects of the present disclosure described in the present specification are merely examples, and other effects may be provided.

Note that the present disclosure can also have the following configurations.

[Item 1]

A detection device including a first sensor that is disposed in a space between a thumb and an index finger and detects first information obtained by sensing a first finger that is a finger included in a first detection area; and a second sensor that is disposed on a palm and detects second information obtained by sensing a second finger that is a finger included in a second detection area.

[Item 2]

The detection device according to item 1, further including a processing unit configured to acquire information for specifying attitudes of the first finger and the second finger on the basis of the first information, the second information, and a relative position-attitude between the first sensor and the second sensor.

[Item 3]

The detection device according to item 2, in which the information for specifying the attitude of the first finger includes a position-attitude of a joint portion included in the first finger, and the information for specifying the attitude of the second finger includes a position-attitude of a joint portion included in the second finger.

[Item 4]

The detection device according to any one of items 1 to 3, in which the first sensor is disposed in a space between a base of the index finger and the thumb.

[Item 5]

The detection device according to any one of items 1 to 4, in which the second sensor is disposed on a hypothenar or a hamate bone of the palm.

[Item 6]

The detection device according to any one of items 1 to 5, further including a mounting unit configured to mount the first sensor and the second sensor on a hand.

[Item 7]

The detection device according to item 6, in which the mounting unit has an opening through which the thumb passes, and includes a covering unit that at least partially covers the palm and the back of the hand, a first housing including the first sensor is provided on the back-side of the hand of the covering unit, and a second housing including the second sensor is provided on the palm-side of the covering unit.

[Item 8]

The detection device according to Item 7, in which a marker for position measurement from a head device is provided on a surface of the first housing.

[Item 9]

The detection device according to item 7 or 8, in which a marker for position measurement from a head device is provided on a surface of the second housing.

[Item 10]

The detection device according to any one of items 1 to 9, further including a contact sensor configured to detect a contact between the thumb and the index finger.

[Item 11]

The detection device according to any one of items 7 to 9, further including a contact sensor configured to detect a contact with at least one of the palm and the back of the hand.

[Item 12]

The detection device according to item 3, further including a calculation unit that calculates the relative position-attitude between the first sensor and the second sensor on the basis of the first information and the second information of the joint portion included in common in the first finger and the second finger.

[Item 13]

The detection device according to item 12, in which the joint portion included in common includes a distal phalanx of the index finger.

[Item 14]

The detection device according to item 12, in which the processing unit calculates a parameter representing a relationship between a first coordinate system of the first sensor and a second coordinate system of the second sensor on the basis of the first information on the finger in common and the second information on the finger in common, acquires position-attitude information of a joint portion included in the first finger on the basis of the first information, and acquires position-attitude information of a joint portion included in the second finger on the basis of the second information, converts position-attitude information of the joint portion included in the second finger into the first coordinate system on the basis of the parameter, and determines a position-attitude of each joint portion of the first finger and the second finger on the basis of the position-attitude information of the joint portion included in the first finger and the position-attitude information of the joint portion included in the second finger.

[Item 15]

The detection device according to item 14, in which the parameter includes a rotation matrix and a translation vector.

[Item 16]

The detection device according to any one of items 1 to 15, in which the first information is depth information including a distance to the first finger, and the second information is depth information including a distance to the second finger.

[Item 17]

A detection method including:

detecting, by a first sensor disposed in a space between a thumb and an index finger, first information obtained by sensing a first finger that is a finger included in a first detection area of the first sensor; and detecting, by a second sensor disposed on a palm, second information obtained by sensing a second finger that is a finger included in a second detection area of the second sensor.

REFERENCE SIGNS LIST

1 Sensor (first sensor)
2 Sensor (second sensor)
10 Mounting unit
11 Main body unit
12 Housing (first housing)
12A Protrusion
13A Detection range
14 Measurement marker
15 Contact sensor
21 Sub unit
22 Housing (second housing)
23A Detection range
24 Measurement marker
25 Contact sensor
41 Processing system
42 Signal processing circuit
43 IMU
44 Calculation unit
45 Capacitance detection circuit
46 Transmission/reception unit
47 Amplifier
48 Vibrator
49 Processing unit
51 Distal phalanx of index finger
100 Controller
200 Computer
201 Transmission/reception unit
202 Transmission/reception unit
212 RGB camera
230 Gesture recognition unit
240 Command generation unit
250 Application unit
300 Head device
301 Infrared irradiation unit
302 Infrared camera unit
303 Right/left hand position-attitude recognition unit
311 IMU
312 RGB camera unit
313 Head position-attitude recognition unit
330 Transmission/reception unit
340 Display driver
351, 352 Display unit

The invention claimed is:

1. A detection device comprising:
a first sensor configured to be disposed in a space between a thumb of a user and an index finger of the user, wherein the first sensor is further configured to detect first information obtained by sensing at least one first finger of the user included in a first detection area;
a second sensor configured to be disposed on a palm of the user, wherein the second sensor is further configured to detect second information obtained by sensing at least one second finger of the user included in a second detection area; and
a processing unit configured to
calculate a relative position-attitude between the first sensor and the second sensor, and
calculate a parameter representing a relationship between a first coordinate system of the first sensor and a second coordinate system of the second sensor based on information related to a finger of the user included in common between the first information and the second information,
wherein the processing unit is further configured to acquire information for specifying attitudes of the at least one first finger of the user and the at least one second finger of the user based on the first information, the second information, and a relative position-attitude between the first sensor and the second sensor,
wherein the information for specifying the attitude of the at least one first finger of the user includes a position-attitude of a joint portion included in the at least one first finger of the user,
wherein the information for specifying the attitude of the at least one second finger of the user includes a position-attitude of a joint portion included in the at least one second finger of the user,
wherein the processing unit calculates the relative position-attitude between the first sensor and the second sensor based on the first information and the second information of the joint portion of the finger of the user included in common,
wherein the processing unit is further configured to
acquire the position-attitude information of the joint portion included in the at least one first finger of the user based on the first information,
acquire the position-attitude information of the joint portion included in the at least one second finger of the user based on the second information,
convert the position-attitude information of the joint portion included in the at least one second finger of the user into the first coordinate system based on the parameter, and
determine a position-attitude of each joint portion of the at least one first finger of the user and the at least one second finger of the user based on the position-attitude information of the joint portion included in the at least one first finger of the user and the position-attitude information of the joint portion included in the at least one second finger of the user, and
wherein the processing unit is implemented via at least one processor.

2. The detection device according to claim 1, wherein the first sensor is further configured to be disposed in a space between a base of the index finger of the user and the thumb of the user.

3. The detection device according to claim 1, wherein the second sensor is further configured to be disposed on at least one of a hypothenar or a hamate bone of the palm of the user.

4. The detection device according to claim 1, further comprising:
a mounting unit configured to mount the first sensor and the second sensor on a hand of the user.

5. The detection device according to claim 4, wherein the mounting unit includes
an opening through which the thumb of the user passes, and
a covering unit that at least partially covers the palm of the user and a back of the hand of the user,
wherein a first housing including the first sensor is configured to be provided on the back of the hand of the user, and
wherein a second housing including the second sensor is configured to be provided on the palm of the hand of the user.

6. The detection device according to claim 5, wherein a marker for position measurement from another device is provided on a surface of the first housing.

7. The detection device according to claim 5, wherein a marker for position measurement from another device is provided on a surface of the second housing.

8. The detection device according to claim 5, further comprising:
a contact sensor configured to detect a contact with at least one of the palm of the user or the back of the hand of the user.

9. The detection device according to claim 1, further comprising:
a contact sensor configured to detect a contact between the thumb of the user and the index finger of the user.

10. The detection device according to claim 1, wherein the joint portion included in common includes a distal phalanx of the index finger of the user.

11. The detection device according to claim 1, wherein the parameter includes at least one of a rotation matrix or a translation vector.

12. The detection device according to claim 1, wherein the first information includes depth information including a distance to the at least one first finger of the user, and
the second information includes depth information including a distance to the at least one second finger of the user.

13. A detection method comprising:
detecting, by a first sensor configured to be disposed in a space between a thumb of a user and an index finger of the user, first information obtained by sensing at least one first finger of the user included in a first detection area of the first sensor;
detecting, by a second sensor configured to be disposed on a palm of the user, second information obtained by sensing at least one second finger of the user included in a second detection area of the second sensor;
calculating a relative position-attitude between the first sensor and the second sensor; and
calculating a parameter representing a relationship between a first coordinate system of the first sensor and a second coordinate system of the second sensor based on information related to a finger of the user included in common between the first information and the second information, wherein the method further comprises acquiring information for specifying attitudes of the at least one first finger of the user and the at least one second finger of the user based on the first information, the second information, and a relative position-attitude between the first sensor and the second sensor, wherein the information for specifying the attitude of the at least one first finger of the user includes a position-attitude of a joint portion included in the at least one first finger of the user, wherein the information for specifying the attitude of the at least one second finger of the user includes a position-attitude of a joint portion included in the at least one second finger of the user, wherein the method further comprises calculating the relative position-attitude between the first sensor and the second sensor based on the first information and the second information of the joint portion of the finger of the user included in common, and wherein the method further comprises acquiring the position-attitude information of the joint portion included in the at least one first finger of the user based on the first information, acquiring the position-attitude information of the joint portion included in the at least one second finger of the user based on the second information, converting the position-attitude information of the joint portion included in the at least one second finger of the user into the first coordinate system based on the parameter, and determining a position-attitude of each joint portion of the at least one first finger of the user and the at least one second finger of the user based on the position-attitude information of the joint portion included in the at least one first finger of the user and the position-attitude information of the joint portion included in the at least one second finger of the user.

* * * * *